United States Patent [19]

Mori et al.

[11] 4,117,592
[45] Oct. 3, 1978

[54] GARDEN SHEARS

[76] Inventors: Eizo Mori; Takao Mori, both of 11 of 473-banchi, Oaza Kuzuha, Hirakata-shi, Osaka-fu, Japan

[21] Appl. No.: 768,197

[22] Filed: Feb. 14, 1977

Related U.S. Application Data

[63] Continuation-in-part of Ser. No. 645,659, Dec. 31, 1975, abandoned.

[30] Foreign Application Priority Data

Jan. 7, 1975 [JP] Japan .................................. 50-4725
Apr. 30, 1975 [JP] Japan .................................. 50-53022

[51] Int. Cl.² ............................................. B26B 13/14
[52] U.S. Cl. .................................................. 30/135
[58] Field of Search .................................. 30/134, 135

[56] References Cited

U.S. PATENT DOCUMENTS 614,167  11/1898  Gardella .................................. 30/135
747,359  12/1903  Barnard .................................. 30/135

FOREIGN PATENT DOCUMENTS 1,126,391  7/1956  France .................................. 30/135

Primary Examiner—Jimmy C. Peters
Attorney, Agent, or Firm—Hall & Houghton

[57] ABSTRACT

A pair of garden shears are provided with the shears having laterally disposed branch retaining means for retaining a branch after it has been cut to prevent a scattering of the cut branches.

1 Claim, 8 Drawing Figures

GARDEN SHEARS

RELATED APPLICATION

The present application is a continuation-in-part of application Ser. No. 645,659, filed Dec. 31, 1975, which is now abandoned.

BACKGROUND OF THE INVENTION (A) Field Of The Invention

The present invention relates to a pair of garden shears.

(B) Description Of The Prior Art

As is known, the conventional garden shears heretofore employed have been designed without any consideration being given whatsoever for simplifying the work of clearing away branches after they have been cut. Therefore, branches after being cut will scatter around the tree, and much time and labor will be required in the gathering or clearing them away. Moreover, in the case of pruning roadside trees, there is also the danger of the branches after being cut off falling down and striking pedestrians.

SUMMARY OF THE INVENTION

The present invention improves on the conventional garden shears so as to prevent branches from scattering after being cut and thereby simplifying the work of clearing them away. Therefore, according to the present invention, a pair of shears is provided with laterally disposed branch retaining means which will prevent branches from scattering after they have been cut.

The branch retaining means is designed to perform a branch retaining operation in association with the branch cutting action of the shears in such a manner that the branch after being cut will be firmly held by the branch retaining means and will not fall unless the operator releases it or transfers the cut branch to a place for collection and then releases it.

Another feature of the present invention is that the construction of the branch retaining means is very simple and the operation of the shears is otherwise the same as that of a conventional pair of shears.

DESCRIPTION OF THE PREFERRED EMBODIMENT

FIGS. 1 to 8 illustrate four different embodiments made in accordance with the present invention directed to a branch cutting operation to be carried out by a closing actuation of the shear elements of a pair of garden shears, but particularly featuring a commmon operation whereby the branch is firmly retained by means of an actuation of the branch retaining means achieved immediately before the completion of the cutting of the branch.

Figure 1:
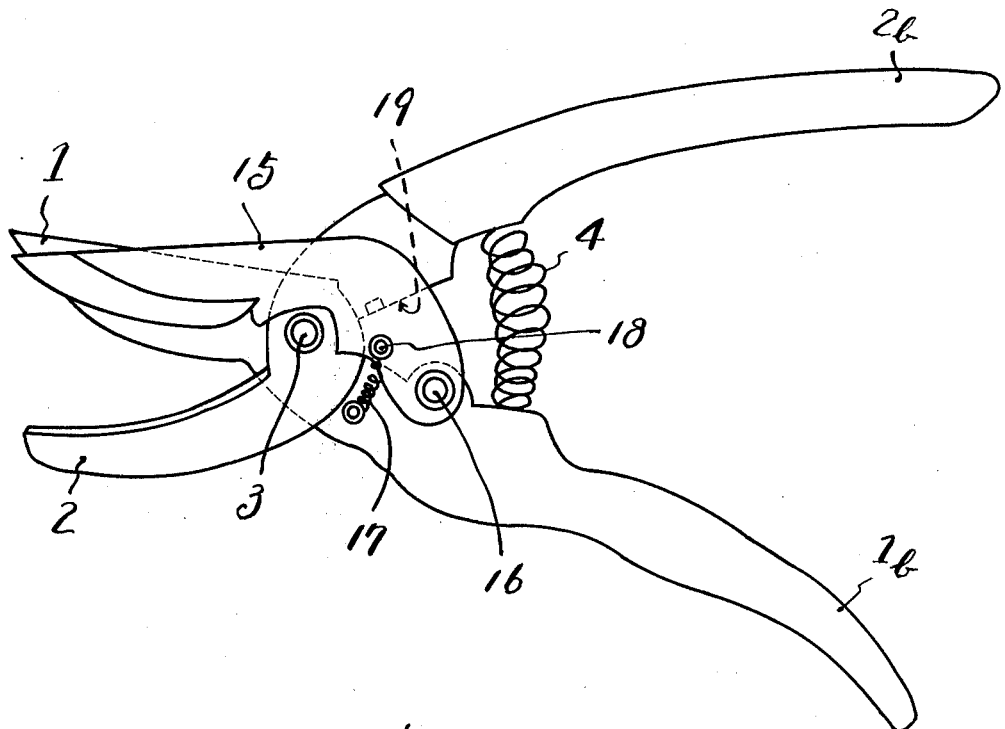
FIG. 1 is a plan view of one embodiment of a pair of garden shears made in accordance with the present invention.
Figure 2:
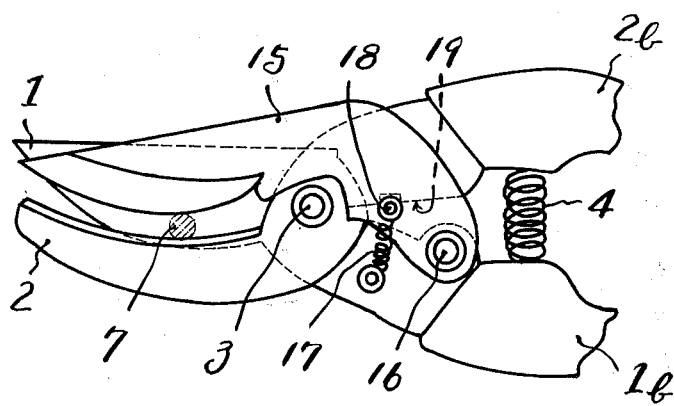
FIG. 2 is a fragmentary plan view of the embodiment shown in FIG. 1 illustrating the branch retaining condition after a branch has been cut.

As shown in FIGS. 1 and 2, the shear elements 1 and 2 are illustrated in an opened and closed condition respectively.

Referring now to FIG. 1, the illustrative embodiment of the shears made in accordance with the present invention shown therein comprises a pair of shear elements 1 and 2 pivoted to one another by a pivot element 3 positioned at a point rearwardly of the shear elements 1 and 2 to permit the opening and closing of the shear elements. The pivot element 3 will extend outwardly on one side beyond the plane of the shear elements 1 and 2 to function as a stop in a manner to be more fully described hereinafter. The shear elements 1 and 2 are provided with integral grip portions 1b and 2b respectively, with the grip portions extending rearwardly therefrom. An opening force is applied to the shear elements 1 and 2 by means of a compression spring 4 spanning the distance between the grip portions 1b and 2b rearwardly of the pivot element 3.

Branch retaining means 15 are pivotally mounted to the shear element 1 by means of a pivot pin 16. The branch retaining member 15 is maintained in normally urged closing position by means of spring 17 secured at one end to a connection pin mounted on the shear element 1 forwardly of the pivot pin 16 and at its opposite end to a projection pin 18 mounted on the branch retaining member 15 forwardly of the pivot pin 16. The projection pin 18 also functions as a stop means for the inner side edge 19 of the shear element 2, as shown in FIG. 2. It will be found desirable that the side edge 19 to be engaged with the projection 18 be provided with a wear-resistant surface. In operation, the two shear elements 1 and 2 are moved in a closing direction, the projection 18 and the side edge 19 of the inner side of the shear element 2 moving in the direction of each other and the closing movement is continued until they come into abutting relationship. The branch retaining member 15 thereafter is forcibly moved in a closing direction. The time of abutment of the projection 18 and edge 19 is set so as to occur immediately before completion of the cutting of the branch. The branch 7 will thereby be firmly retained, as shown in FIG. 2, between the branch retaining member 15 and the shear element 2 after completion of the cutting. In addition, the retaining force is very powerful without being influenced by any spring force.

Figure 3:
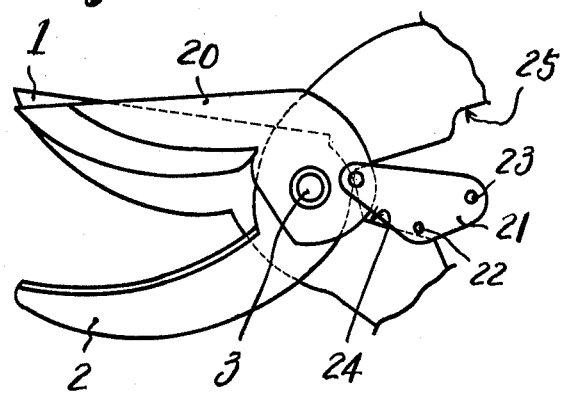
FIG. 3 is a fragmentary plan view of another embodiment made in accordance with the present invention illustrating the cutting action thereof.
Figure 4:
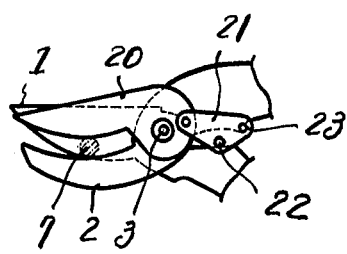
FIG. 4 is a plan view of the embodiment shown in FIG. 3 illustrating the retaining condition after the cutting operation has been carried out.

In the embodiment of the invention shown in FIG. 3, a branch retaining member 20 is pivotally mounted on the same pivot element 3 on which the shear elements 1 and 2 are pivotally mounted. A cam link element 21 is connected to said branch retaining member 20 at a point rearwardly of the pivot element. The cam link element 21 is provided with projection pins 22 and 23, with projection pin 22 being in engagement with an edge portion 24 of the inner side of the shear element 1 rearwardly of the pivot element 3, with the other projection 23 being adapted for engagement with an edge portion 25 of the inner side of the handle of the other shear element 2. Immediately before completion of the cutting of the branch after the two shear elements 1 and 2 have been actuated to same in a closing position, the edge portions 24 and 25 will abut against the projections 22 and 23 on the cam line 21, respectively, so that a force is exerted on the cam link 21 to cause the closing of the branch retaining member 20. Therefore, the branch 7 will be firmly retained, as shown in FIG. 4, by the interaction between the shear element 2 and the branch retaining member 20.

Figure 5:
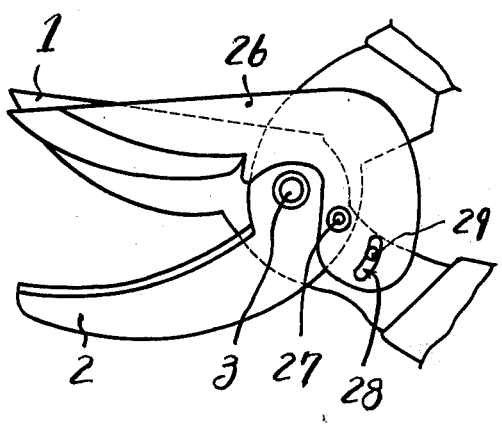
FIG. 5 is a fragmentary plan view of another embodiment made in accordance with the present invention illustrating the cutting action thereof.
Figure 6:
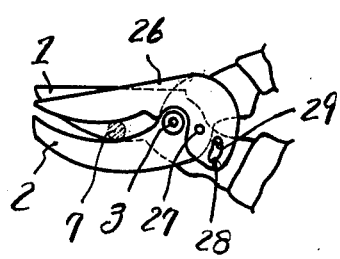
FIG. 6 is a fragmentary plan view of the embodiment shown in FIG. 5 illustrating the branch retaining condition after the branch has been cut.

In the embodiment shown in FIG. 5, a branch retaining member 26 is pivotally connected to shear element 2 by means of a pivot pin 27 positioned rearwardly of the pivot element 3 and by a pivot pin or projection 29 mounted on the other shear element 1, the pin 29 being fitted for movement in an elongated arcuate opening 28 formed in the rear end of the branch retaining member 26. Immediately before completion of the cutting of the branch after the two shear elements 1 and 2 have been actuated to place them in a closing state, the pivot pin 29 mounted on the shear element 1 will move through the arcuate opening 28 of the branch retaining member and will result in the closing of the branch retaining member 26 against the shear element 2. This action will result in the branch 7 being firmly retained, as shown in FIG. 6, by the interaction between the shear element 2 and the branch retaining member 26. In addition, a portion of the branch retaining member 26 may be provided with an opening spring (not shown), if desired.

Figure 7:
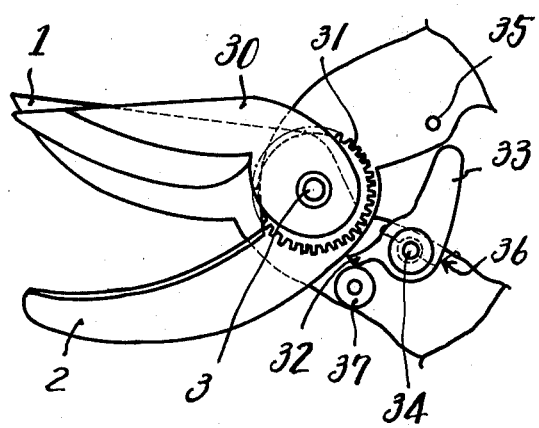
FIG. 7 is a fragmentary plan view of another embodiment made in accordance with the present invention illustrating the cutting action thereof.
Figure 8:
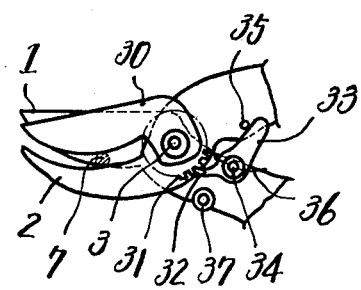
FIG. 8 is a fragmentary plan view of the branch retaining condition after the branch has been cut.

In the embodiment shown in FIGS. 7 and 8, a branch retaining member 30 is pivotally mounted on the pivot 3 on which the two shear elements 1 and 2 are pivotally mounted. The base or rear portion of the branch retaining member 30 has a wheel 31 integrally attached thereto. A lever 33 having a pawl 32 is pivotally mounted on the shear element 1 by means of a pivot pin 34 and in operating relationship with the gear wheel 31. The other shear element 2 has a pivot pin 35 mounted thereon for engagement with the lever 33. The pivot pin 34 has a coiled spring 36 wound therearound with one end of the coiled spring 36 being fixed to a portion of the shear element 1 and the other end to a portion of the lever 33. The spring 36 functions to normally urge the lever 33 away from the gear wheel 31 to a stop 37.

In the above embodiment, shown in FIGS. 7 and 8, immediately before completion of the cutting of the branch after the two shear elements 1 and 2 are actuated to place them in a closing state, the pivot pin 35 pushes the lever 33 to rotate same around the pivot pin 34, causing the pawl 32 to turn the gear wheel 31. This will result in the branch retaining member being firmly closed (as shown in FIG. 8) to hold the branch 7 between it and the shear element 2. Thus, by maintaining the two shear elements 1 and 2 closed after cutting the branch 7, the cut branch 7 will be retained by the retaining member 30, and by opening the shear elements 1 and 2 at a predetermined place, the branch 7 may be released.

We claim:

1. A pair of garden shears comprising a pair of elongated shear elements having complementary cutting portions at the forward end of each and having gripping means for actuating the shear elements at the opposite ends thereof, pivot means spaced rearwardly of said cutting portions connecting said shear elements to one another in pivotal relationship for opening and closing the cutting portions of the shear elements, spring means spaced rearwardly of said pivot means and connecting the shear elements to one another under compression to keep the cutting portions of the shear elements in a normally open state, branch retaining means pivotally mounted adjacent its rearward end thereof to the lateral face of one of the shear elements with which the branch retaining means will not be in cooperation to retain the branch when cut and rearwardly of the pivot point of the shear elements, said branch retaining means having a branch engaging portion at the forward end thereof and lying in superposed relationship with the cutting portion of the shear element to which the branch retaining means is pivoted, said branch engaging means being in aligned operating relationship with the cutting portion of the other shear element, and activating means associated with said branch engaging means for actuating same in association with a shear element to engage a branch to be cut prior to cutting through of the branch, said actuating means comprising projection pin means mounted on said branch retaining means rearwardly of the pivot means on which said shear elements are mounted and forwardly of the point at which said branch retaining means are pivotally mounted to a shear element, said projection pin means being in cooperative relationship with a portion of the inner side edge of the shear element to which said branch retaining means is not mounted to rotate the branch retaining means into strong engagement with the branch to be cut.

* * * * *